(12) United States Patent
Genda

(10) Patent No.: US 11,347,447 B2
(45) Date of Patent: May 31, 2022

(54) INFORMATION PROCESSING APPARATUS, AND IMAGE FORMING APPARATUS

(71) Applicant: FUJIFILM Business Innovation Corp., Tokyo (JP)

(72) Inventor: Kohei Genda, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 109 days.

(21) Appl. No.: 16/102,758

(22) Filed: Aug. 14, 2018

(65) Prior Publication Data

US 2019/0065125 A1 Feb. 28, 2019

(30) Foreign Application Priority Data

Aug. 23, 2017 (JP) .............................. JP2017-160381

(51) Int. Cl.
| | |
|---|---|
| *G06F 3/12* | (2006.01) |
| *G06F 17/18* | (2006.01) |
| *H04N 1/32* | (2006.01) |
| *H04N 1/00* | (2006.01) |
| *H04N 1/12* | (2006.01) |

(52) U.S. Cl.
CPC ............ *G06F 3/121* (2013.01); *G06F 3/1234* (2013.01); *G06F 3/1285* (2013.01); *G06F 3/1287* (2013.01); *G06F 17/18* (2013.01); *H04N 1/00344* (2013.01); *H04N 1/32651* (2013.01); *H04N 1/32694* (2013.01); *H04N 1/12* (2013.01); *H04N 2201/0094* (2013.01)

(58) Field of Classification Search
CPC ...... G06F 3/121; G06F 3/1285; G06F 3/1234; G06F 17/18; G06F 3/1287; H04N 1/00344; H04N 1/32651; H04N 1/32694; H04N 2201/0094; H04N 1/12
USPC ........................................................ 358/1.14
See application file for complete search history.

(56) References Cited

U.S. PATENT DOCUMENTS

| | | | |
|---|---|---|---|
| 7,106,467 B2 | 9/2006 | Takahashi | |
| 8,289,316 B1* | 10/2012 | Reisman | ............ G06F 3/04883 345/419 |
| 10,225,433 B2* | 3/2019 | Takasaki | ............ H04N 1/32651 |
| 10,248,364 B2* | 4/2019 | Chapman | ................ G06F 3/121 |
| 2006/0114750 A1* | 6/2006 | Iida | ........................ G04C 10/00 368/67 |
| 2009/0190921 A1* | 7/2009 | Nakajima | .......... G01M 11/3136 398/13 |

(Continued)

FOREIGN PATENT DOCUMENTS

| | | |
|---|---|---|
| JP | H07311670 | 11/1995 |
| JP | 2001344087 | 12/2001 |

(Continued)

OTHER PUBLICATIONS

Office Action of Japan Counterpart Application, with English translation thereof, dated Apr. 27, 2021, pp. 1-8.

*Primary Examiner* — Darryl V Dottin
(74) *Attorney, Agent, or Firm* — JCIPRNET

(57) ABSTRACT

An information processing apparatus includes specifying unit and a display. The specifying unit specifies whether or not a failure occurring in the information processing apparatus can be suppressed, based on predetermined information. The display that displays information for enabling suppression of the failure in a case where it is determined by the specifying unit that the failure can be suppressed.

10 Claims, 14 Drawing Sheets

(56) References Cited

U.S. PATENT DOCUMENTS

2017/0094105 A1 3/2017 Ohkawa
2019/0173902 A1* 6/2019 Takahashi ............... H04L 12/40

FOREIGN PATENT DOCUMENTS

| JP | 2002229871 | 8/2002 |
| JP | 2004195872 | 7/2004 |
| JP | 2006007516 | 1/2006 |
| JP | 2010176365 | 8/2010 |
| JP | 2012134587 | 7/2012 |
| JP | 2017061045 | 3/2017 |

* cited by examiner

| FAILURE NUMBER | PREVENTION POSSIBILITY LIST |
|---|---|
| 001-001 | POSSIBLE |
| 001-002 | POSSIBLE |
| 001-003 | NOT POSSIBLE |
| ... | ... |
| 099-073 | NOT POSSIBLE |
| ... | ... |

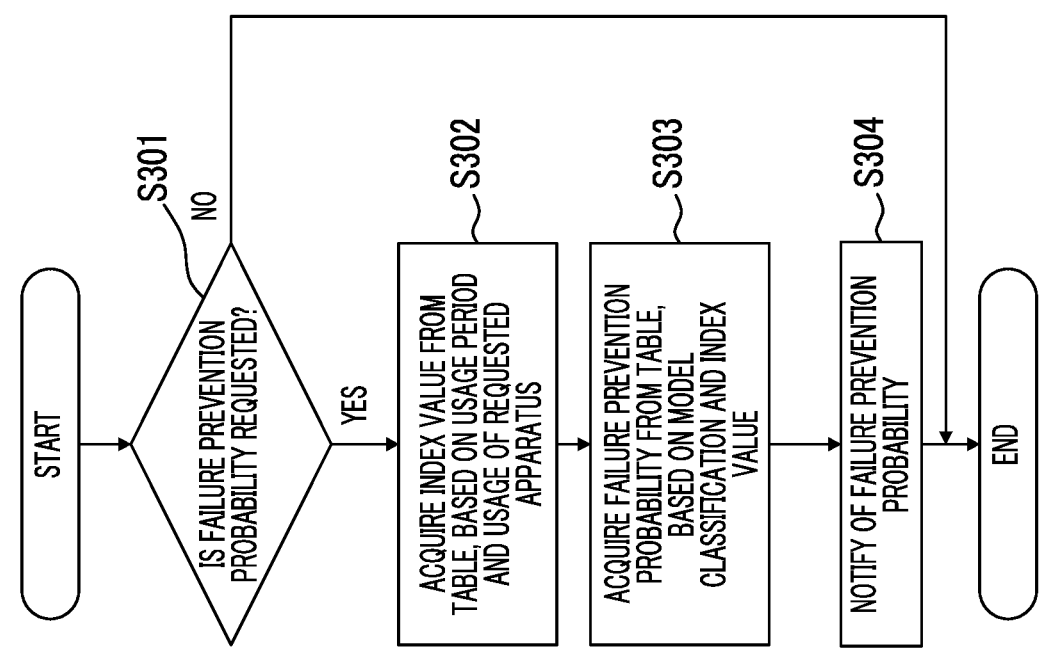

| MODEL CODE |
|---|
| MONTHLY USAGE |
| DELIVERY HISTORY OF MAINTENANCE PARTS |
| PREVENTION SUCCESS OR FAILURE OF OCCURRENCE OF RELATED FAILURE DUE TO DELIVERY |

MODEL CLASSIFICATION = ApeosProt 55xx

| CONSUMABLES AND MAINTENANCE PARTS | RELATED FAILURE CODE | |
|---|---|---|
| BLACK TONER | 003-211 | 003-215 |
| CYAN TONER | 003-214 | |
| MAGENTA TONER | 003-214 | |
| | | |
| TONER COLLECTION BOTTLE | 004-319 | 004-322 |
| | | |

GENERATED FOR EACH MODEL

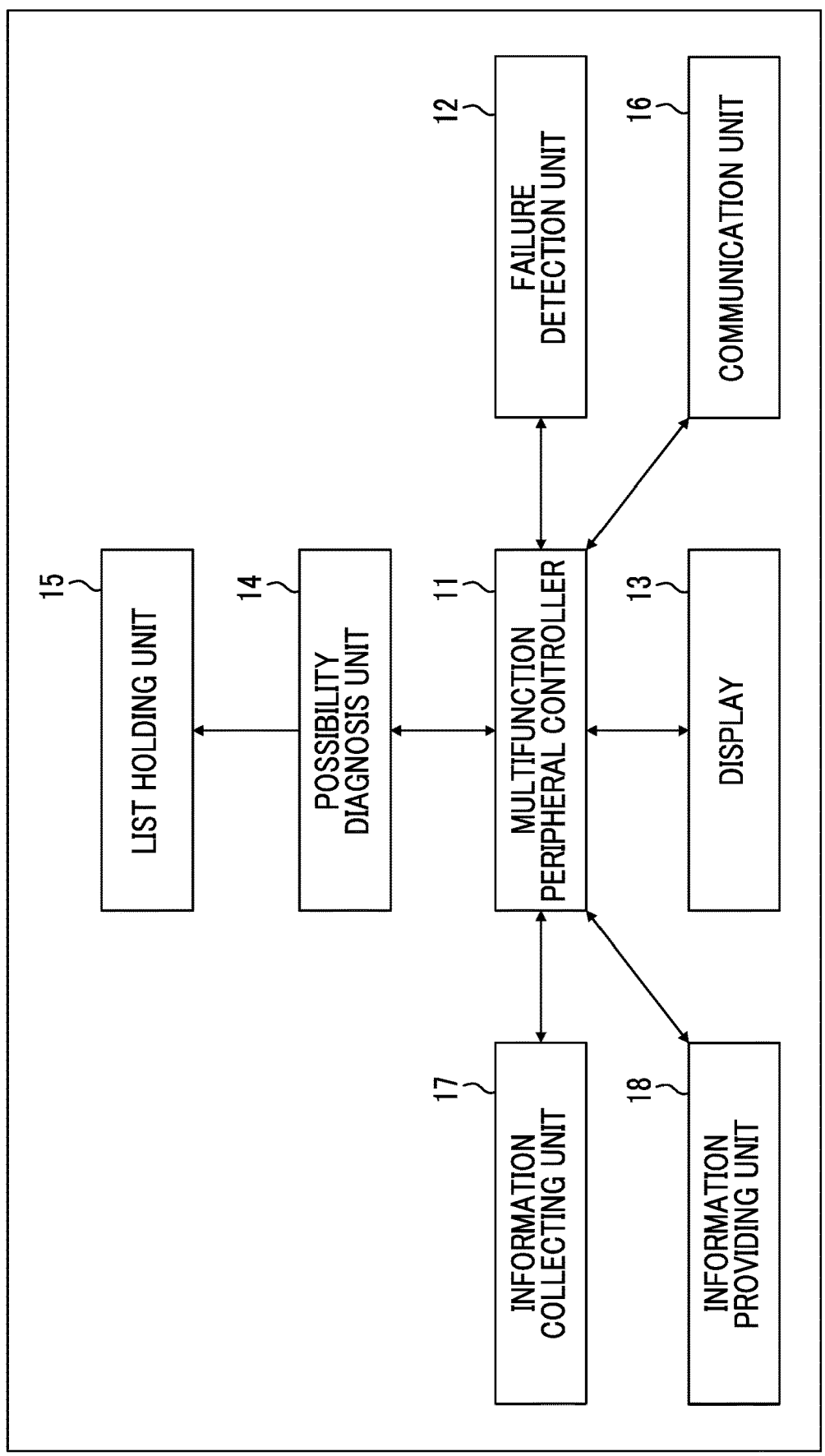

INFORMATION PROCESSING APPARATUS, AND IMAGE FORMING APPARATUS

CROSS-REFERENCE TO RELATED APPLICATIONS

This application is based on and claims priority under 35 USC 119 from Japanese Patent Application No. 2017-160381 filed Aug. 23, 2017.

BACKGROUND

Technical Field

The present invention relates to an information processing apparatus, and an image forming apparatus.

SUMMARY

According to an aspect of the invention, there is provided an information processing apparatus including a specifying unit that specifies whether or not a failure occurring in the information processing apparatus can be suppressed, based on predetermined information; and a display that displays information for enabling suppression of the failure in a case where it is determined by the specifying unit.

BRIEF DESCRIPTION OF THE DRAWINGS

Exemplary embodiment(s) of the present invention will be described in detail based on the following figures, wherein:

FIG. 2A is a block diagram of the image forming apparatus, and FIG. 2B is a diagram showing an example of a prevention possibility list retained in a list holding unit;

FIG. 4A shows an example thereof and FIG. 4B shows another example;

FIG. 8A shows an example thereof and FIG. 8B shows another example;

FIGS. 9A to 9C are diagrams for explaining a process of a time prediction server of the information providing system according to the second exemplary embodiment, FIG. 9A is a flowchart thereof, and FIGS. 9B and 9C show table used for processing by the time prediction server;

FIG. 10A is a diagram for explaining elements used for calculation of the failure prevention probability, and FIG. 10B is a failure code table caused by consumables and maintenance parts;

FIG. 11 is a diagram for explaining the configuration of an image forming apparatus according to a third exemplary embodiment;

DETAILED DESCRIPTION

Hereinafter, an exemplary embodiment of the present invention will be described in detail with reference to the accompanying drawings.

Figure 1:
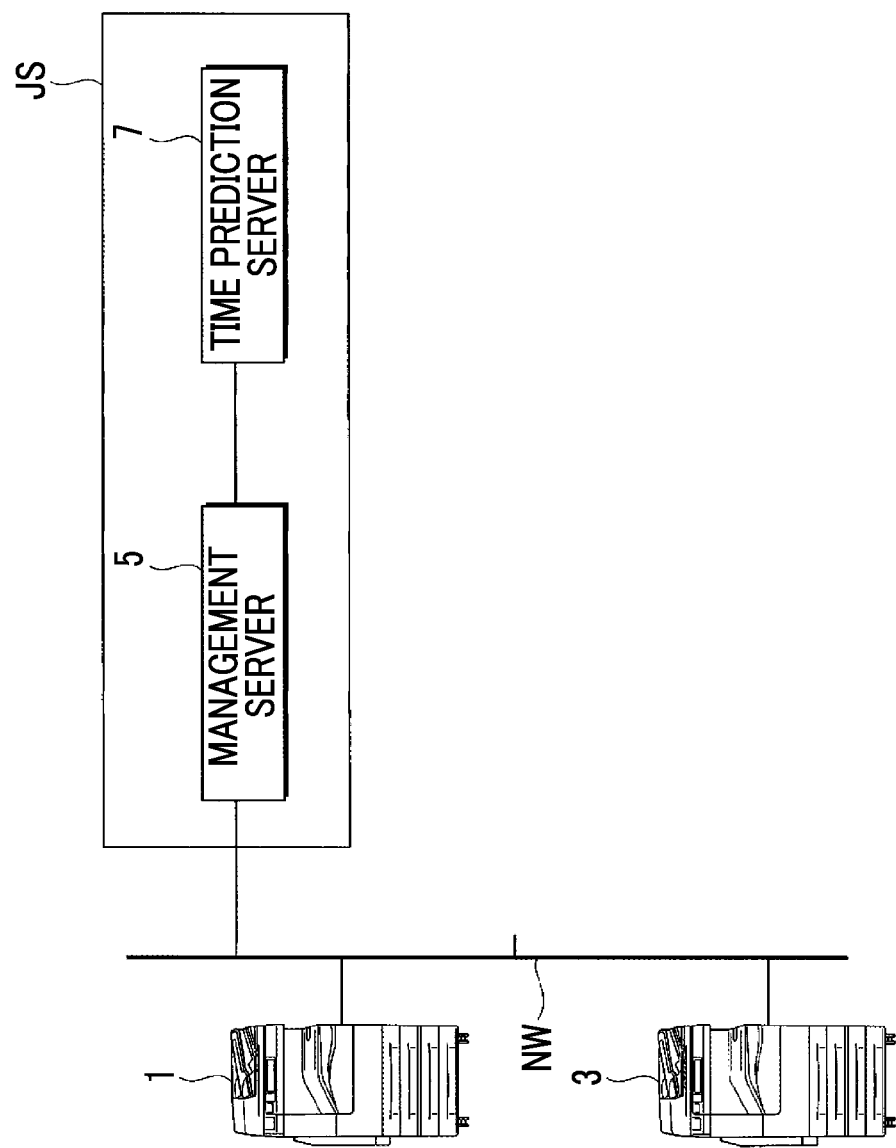
FIG. 1 is a diagram showing an example of image forming apparatuses and an information providing system of the present exemplary embodiment.

FIG. 1 is a diagram showing an example of image forming apparatuses 1, 3 and an information providing system JS of the present exemplary embodiment.

As shown FIG. 1, the information providing system JS is a system that provides information to the image forming apparatuses 1, 3, and is connected to the image forming apparatuses 1, 3 over a network NW.

The information providing system JS includes a management server 5 having a function of managing the image forming apparatuses 1, 3 such as providing information, and a time prediction server 7 having a function of predicting a failure occurrence time for the image forming apparatuses 1, 3. The management server 5 and the time prediction server 7 may be realized physically in one computer or may be realized as distributed processes by plural computers.

The image forming apparatuses 1, 3 are uniquely specified by unique numbers assigned in advance, and the management server 5 manages the image forming apparatuses 1, 3 with such numbers.

The image forming apparatuses 1, 3 are apparatuses that print an image on a medium and output a printed document. The image forming apparatuses 1, 3 are a so-called "multifunction peripheral" having basic functions such as a printer function, a copy function, a scanner function, a communication function, and the like.

As the image forming method in the image forming apparatuses 1, 3, for example, an electrophotographic method may be used, but other methods may be used.

The management server 5 and the time prediction server 7 are apparatuses that perform predetermined information processing based on information from the image forming apparatuses 1, 3 and output processing results. For example, the management server 5 and the time prediction server 7 are configured with a central processing unit (CPU) that executes software and performs calculations, a random access memory (RAM), a read only memory (ROM), a display device such as a display, an input device that inputs data to a computer main body, and the like. As the management server 5 and the time prediction server 7, for example, a personal computer, a workstation, or another computer is used.

In addition, FIG. 1 shows a status where the image forming apparatuses 1, 3 are connected to the information providing system JS through the network NW. The image forming apparatuses 1, 3 perform data communication with the information providing system JS at a timing of about once a day, on a fixed date or time, or the like, in addition to the time of startup and failure.

In addition, the image forming apparatuses 1, 3 may not be physically connected through the network NW. In addition, although the image forming apparatuses 1, 3 are physically connected to the information providing system JS through the network NW, the image forming apparatuses 1, 3 may not transmit data to the information providing system JS.

Here, the image forming apparatuses 1, 3 periodically or irregularly notify the server in a management company of the state of themselves, so that the management company knows the states of the image forming apparatuses 1, 3 and provides a management service of preventing the occurrence of a failure.

However, for such a service, it is necessary to connect the image forming apparatuses 1, 3 to the network NW and to sign a contract for service provision. On the other hand, at the time of not receiving service, it is generally difficult for the administrator or user of the image forming apparatus 1 or 3 to infer the effect of the service, and it is also difficult to estimate the cost effectiveness by making a contract. Under such circumstances, there is a problem that the failure is handled after the failure occurred for the image forming apparatuses 1 and 3 that do not subscribe to the service, a period (downtime) during which the image forming apparatuses 1, 3 cannot be used due to the failure is lengthened, and it is difficult to sufficiently utilize the image forming apparatuses 1, 3.

Therefore, in the present exemplary embodiment, an administrator or the like recognizes the effect to be achieved in the case of subscription before service subscription, thereby attempting to promote service subscription. More specifically, in the present exemplary embodiment, how much failure can be prevented beforehand by actually utilizing the service is estimated based on the information according to the usage status of the image forming apparatuses 1, 3, and is presented to the administrator, so the administrator can recognize the effect of the service and is prompted to make a contract. The usage statuses of the image forming apparatuses 1, 3 can be estimated even from information from a single apparatus, and furthermore, can be estimated more accurately by collecting usage status of plural apparatuses in the vicinity.

Hereinafter, the configuration and control in various exemplary embodiments will be specifically described.

First Exemplary Embodiment

Figures 2A, 2B:
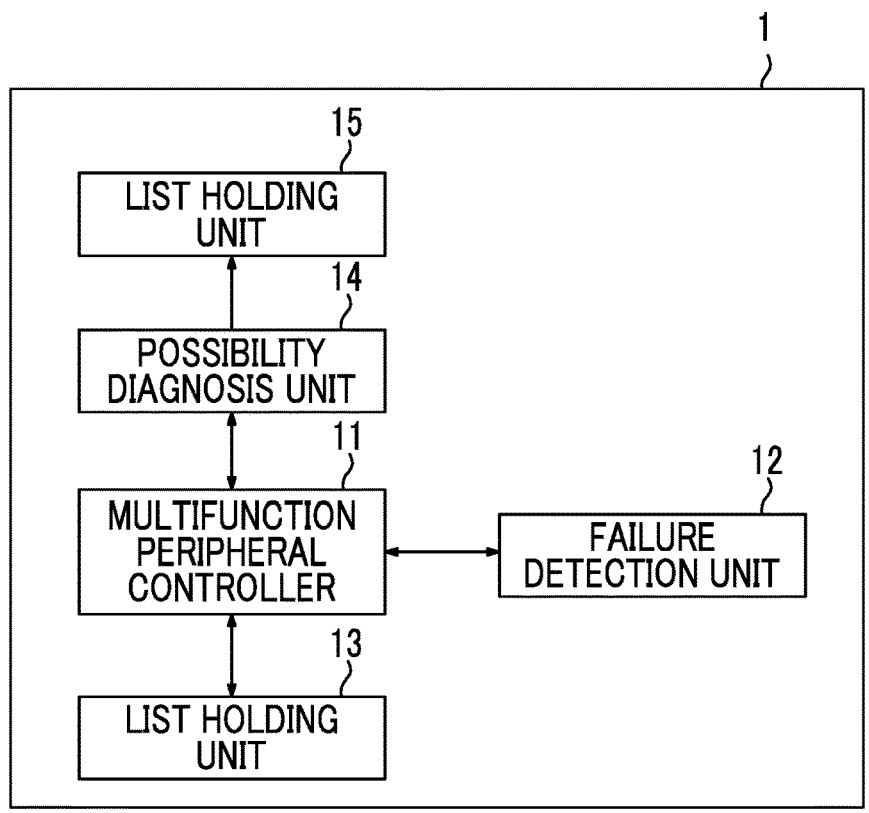
FIGS. 2A and 2B are diagrams for explaining the configuration of the image forming apparatus according to the first exemplary embodiment.

FIGS. 2A and 2B are diagrams for explaining the configuration of the image forming apparatus 1 according to the first exemplary embodiment, FIG. 2A is a block diagram of the image forming apparatus 1, and FIG. 2B is a diagram showing an example of a prevention possibility list retained in a list holding unit 15. The image forming apparatus 3 may be configured differently from the image forming apparatus 1, but the image forming apparatus 3 may have the same configuration, and thus the description thereof will be omitted.

As shown in FIG. 2A, the image forming apparatus 1 according to the first exemplary embodiment includes a multifunction peripheral controller 11 that controls plural functions such as the above-described printer function, and a failure detection unit 12 that detects occurrence of a failure in the image forming apparatus 1. Further, the image forming apparatus 1 is provided with a display unit 13 configured with a touch panel or the like which displays various types of information including information on failures. Furthermore, the image forming apparatus 1 includes a possibility diagnosis unit 14 that diagnoses whether or not the failure detected by the failure detection unit 12 can be prevented beforehand, and a list holding unit 15 that holds a prevention possibility list used for diagnosis by the possibility diagnosis unit 14. The possibility diagnosis unit 14 is an example of a specifying unit, and the display unit 13 is an example of a display. The failure detection unit 12 is an example of a failure recognition unit.

In addition to the diagnosis in a case where a failure is detected by the failure detection unit 12, the possibility diagnosis unit 14 may perform diagnosis in a case where information is displayed on the display unit 13. That is, after the failure is detected by the failure detection unit 12, the possibility diagnosis unit 14 performs diagnosis on the failure. In other words, the possibility diagnosis unit 14 does not perform diagnosis before failure detection.

As shown in FIG. 2B, correspondence relationships between failure numbers and prevention availability are defined in the prevention possibility list retained by the list holding unit 15. The failure number referred to herein specifies the content of the failure detected by the failure detection unit 12, and this information is transmitted from the failure detection unit 12 to the possibility diagnosis unit 14.

In the example shown in FIG. 2B, the failure numbers "001-001" and "001-002" can be prevented beforehand, and the failure numbers "001-003" and "099-073" cannot be prevented beforehand. Examples of failures referred to herein that can be prevented beforehand include those caused by consumables, and examples of failures that cannot be prevented beforehand include those caused by wear parts such as rubber and springs to which no sensor is attached. Other failures that cannot be prevented beforehand can include those caused by user interface (UI) touch panel, electronic components constituting the substrate, and the like of which time to break depends on various conditions such as individual differences.

Other failures that cannot be prevented beforehand can include those caused by the reduction of the light amount, deviation of the reading focus, and vertical and horizontal inclination of a scanner, occurrence of abnormal noise of movable parts, a color adjustment failure, and the like.

In the image forming apparatus 1 having such a configuration, in a case where a failure is detected by the failure detection unit 12, the possibility diagnosis unit 14 diagnoses whether or not the failure can be prevented beforehand by using the prevention possibility list in the list holding unit 15. Then, in a case where the diagnosis result indicates that a failure can be prevented beforehand, a message indicating that a failure can be prevented beforehand is displayed on the display unit 13. By viewing the display on the display unit 13, the administrator or user of the image forming apparatus 1 can recognize that there is a measure to prevent recurrence.

In this way, the image forming apparatus 1 notifies the information providing system JS of a failure that has occurred and determines whether or not the failure is a failure that can be prevented beforehand, displays on the display unit 13 a fact that the failure can be prevented beforehand in a case where the failure is a failure that can be prevented beforehand, and can appeal to the administrator or the user a function of preventing the occurrence of a failure beforehand.

A series of information display control from the detection of a failure to the display indicating that the failure can be prevented beforehand is performed in the image forming apparatus 1. In other words, such control can be executed without acquiring information from the outside, that is, from the information providing system JS (see FIG. 1). In other words, the image forming apparatus 1 does not need to communicate with the information providing system JS (see FIG. 1) through the network NW, in a case of displaying that the failure can be prevented beforehand on the display unit 13.

Further, since the image forming apparatus 1 is normally provided with the multifunction peripheral controller 11, the failure detection unit 12, the display unit 13, the possibility diagnosis unit 14, and the list holding unit 15, it is possible to display that the failure can be prevented beforehand, without a maintenance contract with the management company.

Next, the processing procedure of the image forming apparatus 1 according to the first exemplary embodiment will be described.

Figure 3:
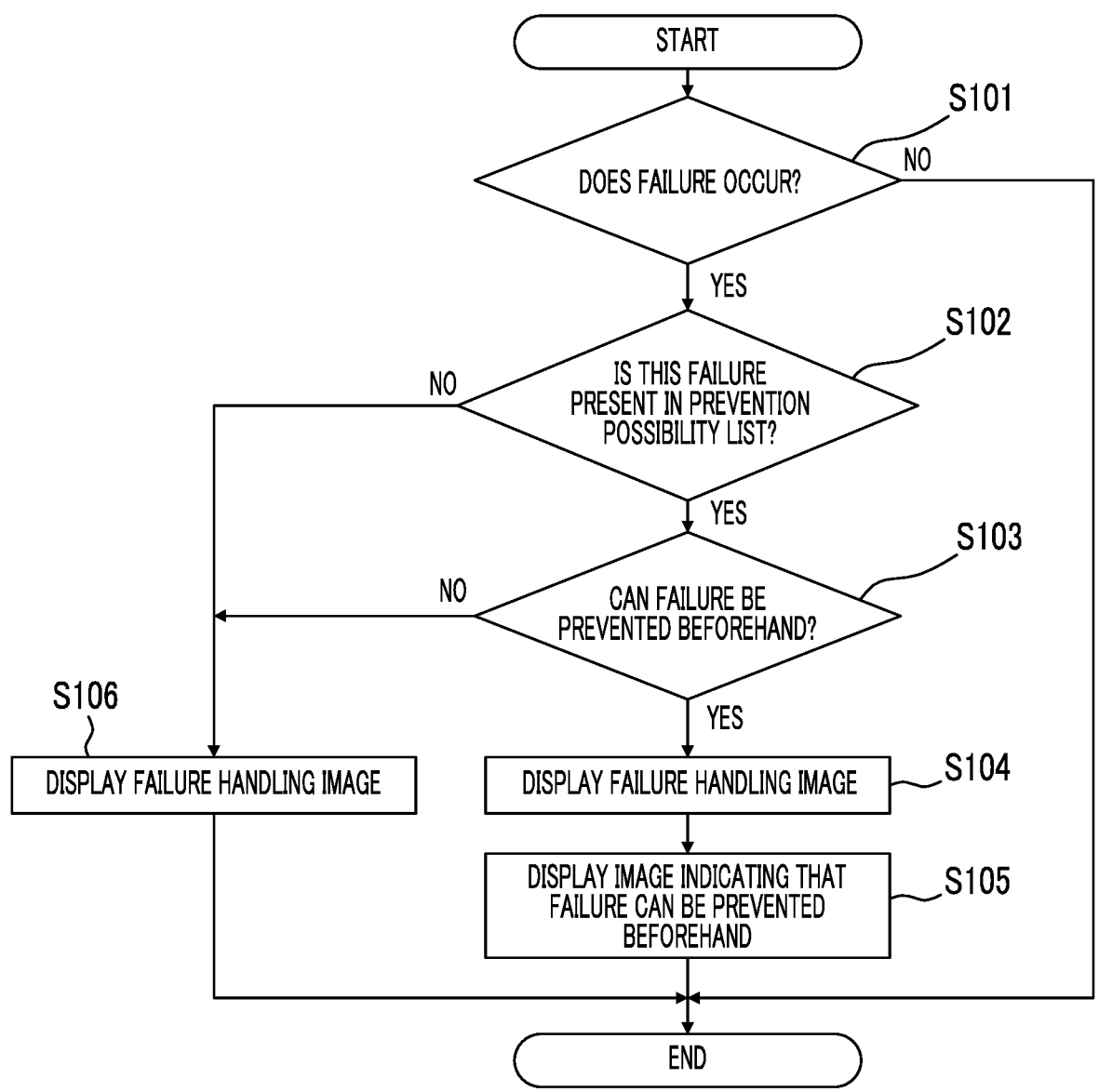
FIG. 3 is a flowchart showing a processing procedure of the image forming apparatus.

FIG. 3 is a flowchart showing a processing procedure of the image forming apparatus 1 according to the first exemplary embodiment.

In the example of the processing procedure shown in FIG. 3, in the image forming apparatus 1, it is determined whether or not the occurrence of a failure is detected by the failure detection unit 12 (see FIG. 2A) (S101), and in a case of detection (Yes in S101), the possibility diagnosis unit 14 diagnoses whether or not the detected failure is on the prevention possibility list (S102). As described above, such a prevention possibility list is retained by the list holding unit 15.

In a case where the detected failure is on the prevention possibility list (Yes in S102), the possibility diagnosis unit 14 refers to the prevention possibility list and determines whether or not the detected failure can be prevented beforehand (S103). In a case where the determination result indicates that a failure can be prevented beforehand (Yes in S103), first, a failure handling image is displayed on the display unit 13 (S104), and then "the current failure can be prevented beforehand" (for example, an image indicating that failure can be prevented beforehand in FIG. 4A) is displayed on the display unit 13 (S105).

The failure handling image referred to herein is an image to be displayed for handling of the failure that has occurred. For example, the image is displayed to inform how to handle the occurred failure, and the image represents the handling contents concretely or implicitly. That is, in addition to the case where the administrator or the user knows how to handle the failure only by looking at the image, the administrator or the user may know how to handle the failure by referring to other images or instruction manual on the display unit 13 in some cases.

In addition, the failure handling image referred to herein may be displayed in a case of informing the administrator or the user that the failure has been handled in collaboration with the information providing system JS (see FIG. 1).

In addition, the failure handling image may be display contents using a figure, in addition to display contents (text information) which does not include a figure but include only characters and numerals.

In addition, the image indicating that failure can be prevented beforehand referred to herein is an image displayed to inform that there is a measure to make it possible to prevent a failure that have occurred this time and represents a fact that the current failure can be prevented beforehand. The image indicating that failure can be prevented beforehand includes information for promoting subscription to the service through the network NW. That is, the image indicating that failure can be prevented beforehand is to inform that there is a way (recurrence prevention measure) capable of reducing the possibility of the recurrence of the current failure and represents information for suppressing the recurrence of the current failure. The prevention in the image indicating that failure can be prevented beforehand includes prevention of occurrence of other failures as well as prevention of recurrence of the current failure, but an example limited to prevention of occurrence of the current failure is also considered.

In addition, the failure handling image may be display contents using a figure, in addition to display contents (text information) which does not include a figure but include only characters and numerals.

The image indicating that failure can be prevented beforehand referred to herein is information indicating that a failure can be prevented beforehand and is an example of information for making it possible to suppress the recurrence of a failure.

Returning to FIG. 3 and continuing the explanation, in a case where the detected failure is not in the prevention possibility list (No in S102) or in a case where the detected failure cannot be prevented beforehand (No in S103), the failure handling image is displayed on the display unit 13 (S106). That is, in such a case, only the failure handling image is displayed, and the image indicating that failure can be prevented beforehand is not displayed.

In a case where the occurrence of a failure is not detected by the failure detection unit 12 (No in S101), the process is ended as it is.

Figure 4A:
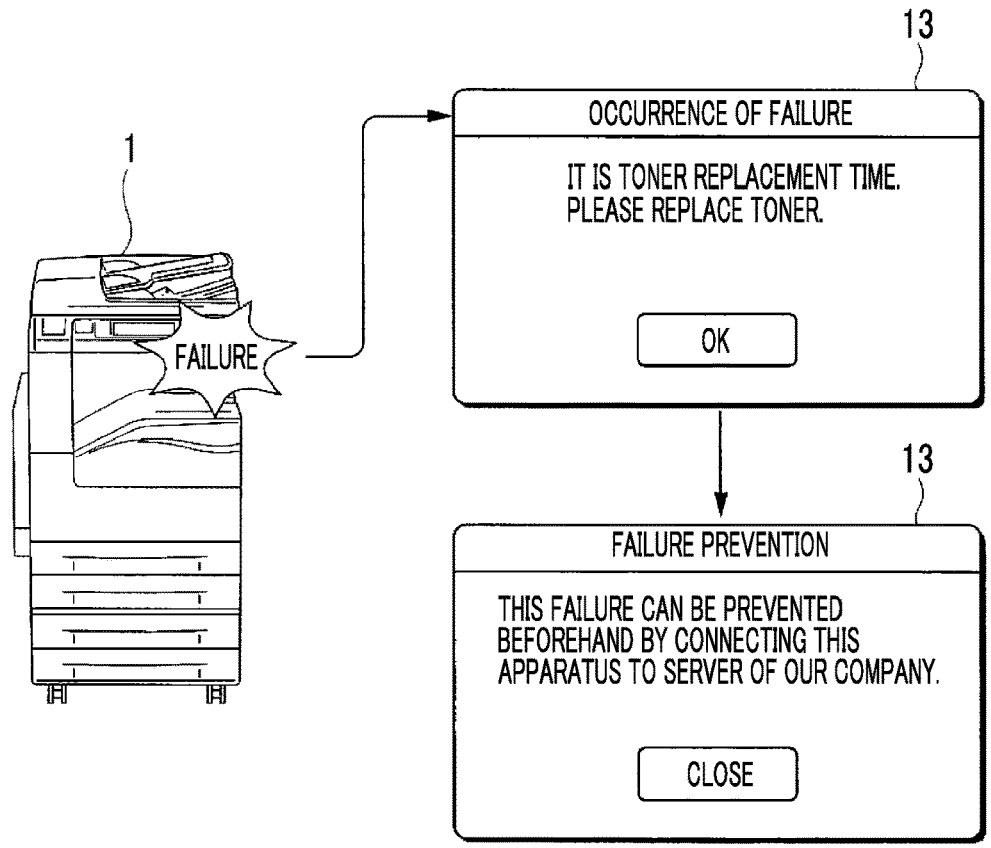
FIGS. 4A and 4B are diagrams for explaining an example of images displayed on a display unit when the detected failure can be prevented beforehand.
Figure 4B:
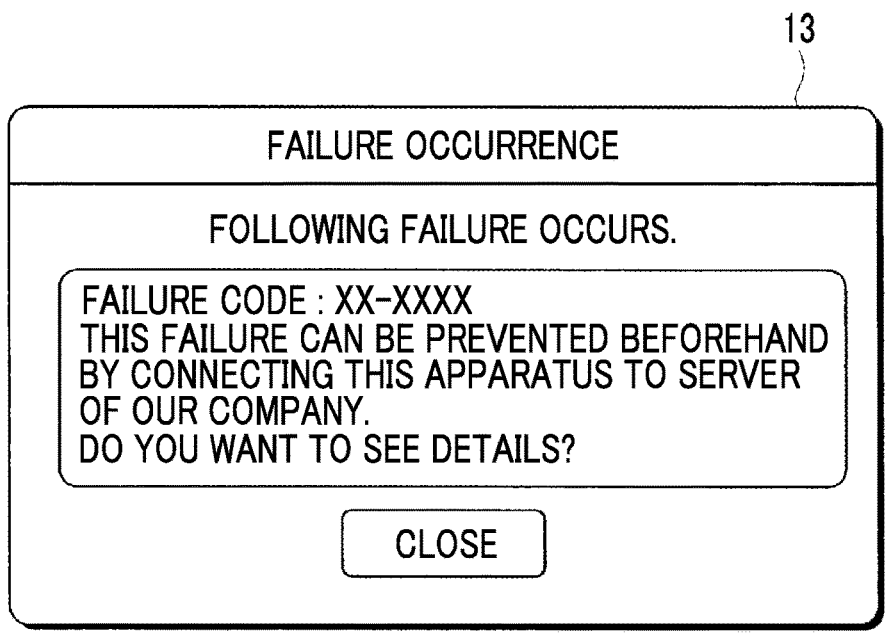

FIGS. 4A and 4B are diagrams for explaining an example of images displayed on the display unit 13 when the detected failure can be prevented beforehand, FIG. 4A shows one example thereof and FIG. 4B shows another example.

As shown in the diagram on the left side of FIG. 4A, in a case where a failure is detected in the image forming apparatus 1 and the failure is a failure which can be prevented beforehand, first, as shown in the upper right diagram of FIG. 4A, an having a title "failure occurrence" is displayed on the display unit 13 as a failure handling image (see S104, S106 in FIG. 3). Such a failure handling image corresponds to the fact that there is no remaining amount in the toner bottle installed in the image forming apparatus 1 and the toner replacement is necessary. That is, the image informs that the failure of the image forming apparatus 1 is resolved by replacing the toner. Specifically, the display unit 13 displays an image "it is toner replacement time. Please replace the toner", and "OK" button is also set in the area on the screen.

As shown in the lower right drawing of FIG. 4A, an image titled "failure prevention" is displayed on the display unit 13 as the image indicating that failure can be prevented beforehand, and a "close" button is also set in the area on the screen. More specifically, by connecting the image forming apparatus 1 in which a failure has occurred to the information providing system JS (see FIG. 1) through the network NW, it is notified that recurrence of the current failure can be prevented.

In another example shown in FIG. 4B, the above-described failure handling image and image indicating that failure can be prevented beforehand are simultaneously displayed on the display unit 13. That is, the image of the display unit 13 shown in FIG. 4B includes a failure handling image indicating a failure code and an image indicating that failure can be prevented beforehand indicating that recurrence can be prevented by connecting the image forming apparatus 1 to the information providing system JS.

The administrator or the user can know a failure specifying and coping method by the failure code on the failure handling image, for example, from the instruction manual and other display contents on the display unit 13.

The image indicating that failure can be prevented beforehand is an example of information for promoting subscription to a service through a network, and the failure handling image is an example of a display of a failure recognized by the failure recognition unit.

Second Exemplary Embodiment

Figure 5:
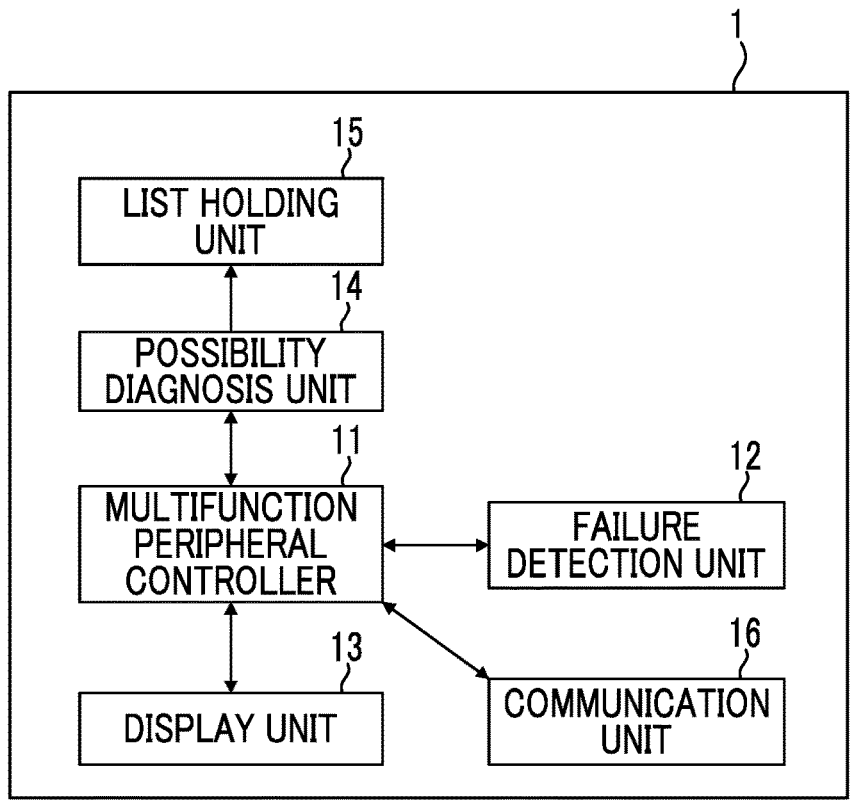
FIG. 5 is a diagram for explaining the configuration of an image forming apparatus according to a second exemplary embodiment.

FIG. 5 is a diagram for explaining the configuration of an image forming apparatus 1 according to a second exemplary embodiment. Since the image forming apparatus 1 according to the second exemplary embodiment has a configuration common to the case of the above-described first exemplary embodiment, a description of a common configuration may be omitted in some cases.

As shown in FIG. 5, the image forming apparatus 1 according to the second exemplary embodiment includes a communication unit 16 that communicates with the information providing system JS (see FIG. 1) through the network NW, in addition to the multifunction peripheral controller 11, the failure detection unit 12, the display unit 13, the possibility diagnosis unit 14 and the list holding unit 15, which are described above.

The communication unit 16 of the image forming apparatus is an example of a reception unit that receives the probability that the recurrence is to be suppressed based on the failure information of the image forming apparatus 1 (for example, a failure number), and is an example of a transmitting unit that transmits information including its own failure information to the information providing system JS side.

The communication unit 16 of the image forming apparatus 1 transmits the usage status, the internal status, and the failure information (failure history) of the image forming apparatus 1 to the information providing system JS. Further, the communication unit 16 receives the information processing result by the information providing system JS.

For example, in the image forming apparatus 1, the communication unit 16 transmits the detection content of a failure by the failure detection unit 12 to the information providing system JS, the information providing system JS processes the detection content, and the communication unit 16 receives the processing result. Therefore, in the second exemplary embodiment, in cooperation with the information providing system JS, it is possible to cope with the failure of the image forming apparatus 1.

Figure 6:
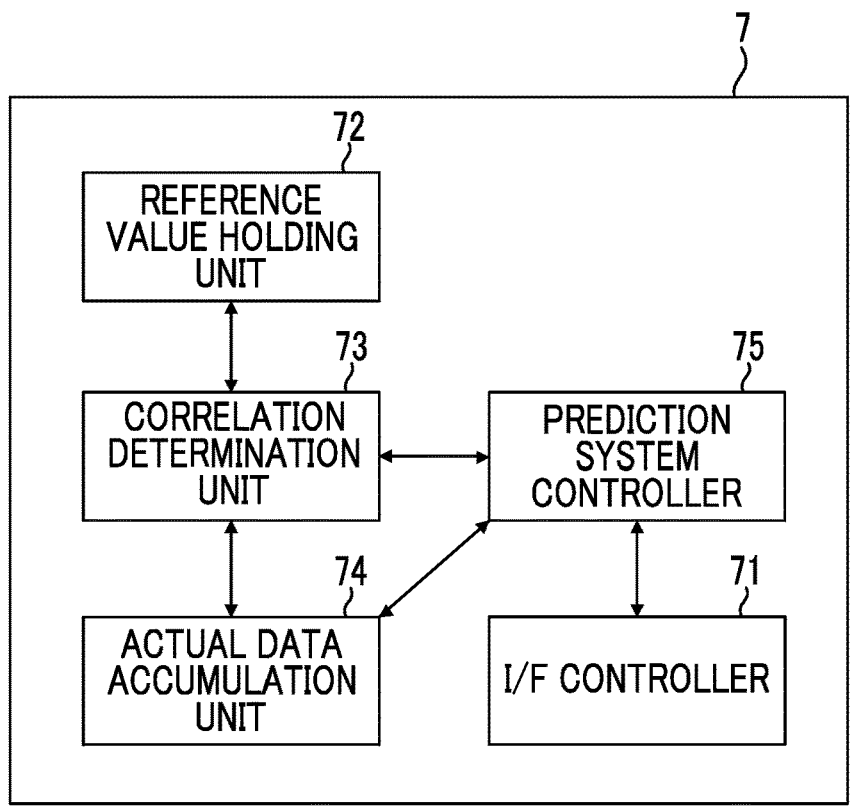
FIG. 6 is a diagram for explaining the configuration of a time prediction server in the information providing system.

FIG. 6 is a diagram for explaining the configuration of a time prediction server 7 in the information providing system JS according to the second exemplary embodiment.

As shown in FIG. 6, the time prediction server 7 of the information providing system JS includes an I/F controller 71 that controls data transmission and reception to and from the image forming apparatus 1, a reference value holding unit 72 that retains a reference value for failure beforehand handling, a correlation determination unit 73 that determines the correlation between failure handling and failure occurrence based on the actual data and the reference value, and an actual data accumulation unit 74 that accumulates failure handling methods and actual data on failure occurrence.

Here, the reference value retained by the reference value holding unit 72 refers to a condition requiring handling in order to prevent the occurrence of a failure beforehand, and it is a numerical value obtained through experience and by statistically analyzing a value which is appropriate for handling. For example, in the case where the replacement is indispensable when the amount left by wear of the belt of the rotary press is 3 mm, the part name and 3 mm are reference values. The reference value is changed (or optimized) by the correlation determination unit 73, as will be described later.

The correlation determination unit 73 compares the value of the consumable sent from the image forming apparatus 1 and accumulated in the actual data accumulation unit 74 on a daily basis and the fact that the failure has occurred with the reference value in the reference value holding unit 72 and determines whether or not the reference value has been exceeded. In addition, when the occurrence of a failure is repeated despite the fact that the reference value is not exceeded, the correlation determination unit 73 optimizes the reference value, thereby making it possible to cope with the occurrence of a failure before occurrence of a failure, so that the occurrence of a failure can be prevented beforehand.

The actual data accumulation unit 74 stores data of the consumables that is notified from the image forming apparatus 1 on a daily basis and stores failures occurring in association with the consumables as actual data, and functions as a database.

As shown in FIG. 6, the time prediction server 7 of the information providing system JS includes a prediction system controller 75 that derives the failure prevention probability, based on the determination result by the correlation determination unit 73 and the actual data stored in the actual data accumulation unit 74. The failure prevention probability derived by the prediction system controller 75 is transmitted to the image forming apparatus 1 by the I/F controller 71 and displayed on the display unit 13 (see FIG. 5). Such failure prevention probability is derived in a case where the image forming apparatus 1 does not receive the management service by the management company (in a case where the image forming apparatus 1 is not to be managed).

In a case where the image forming apparatus 1 receives the management service, the prediction system controller 75 predicts the time of replacement of consumables and parts from the above-described internal state and history of failure information for each type of the image forming apparatus 1 and determines whether or not replenishment of consumables and replacement of parts are necessary. Examples of the history of failure information include a fact that there is no remaining amount of a toner and replacement parts are out of stock at the installation place of the image forming apparatus 1, that the toner collection bottle is full, that the occurrence frequency of paper jams increases due to wear of the paper feeder, that copying quality is deteriorated due to wear of the drum, and the like.

Then, as a result of the determination by the prediction system controller 75, in a case where replenishment or replacement is necessary, the management company delivers consumables or the like and allocates maintenance workers, which prevents that a failure does not occur in the image forming apparatus 1 to be managed. Such handling is an example of a management service for suppressing occurrence of failures, performed by the management server 5 of the information providing system JS.

Further, the prediction system controller 75 calculates the performance of zeroing the downtime of the apparatus by sending consumables or exchanging parts as described above. The calculation of the performance can be used to derive the failure prevention probability in a case where the management service by the management company is not received.

Figure 7:
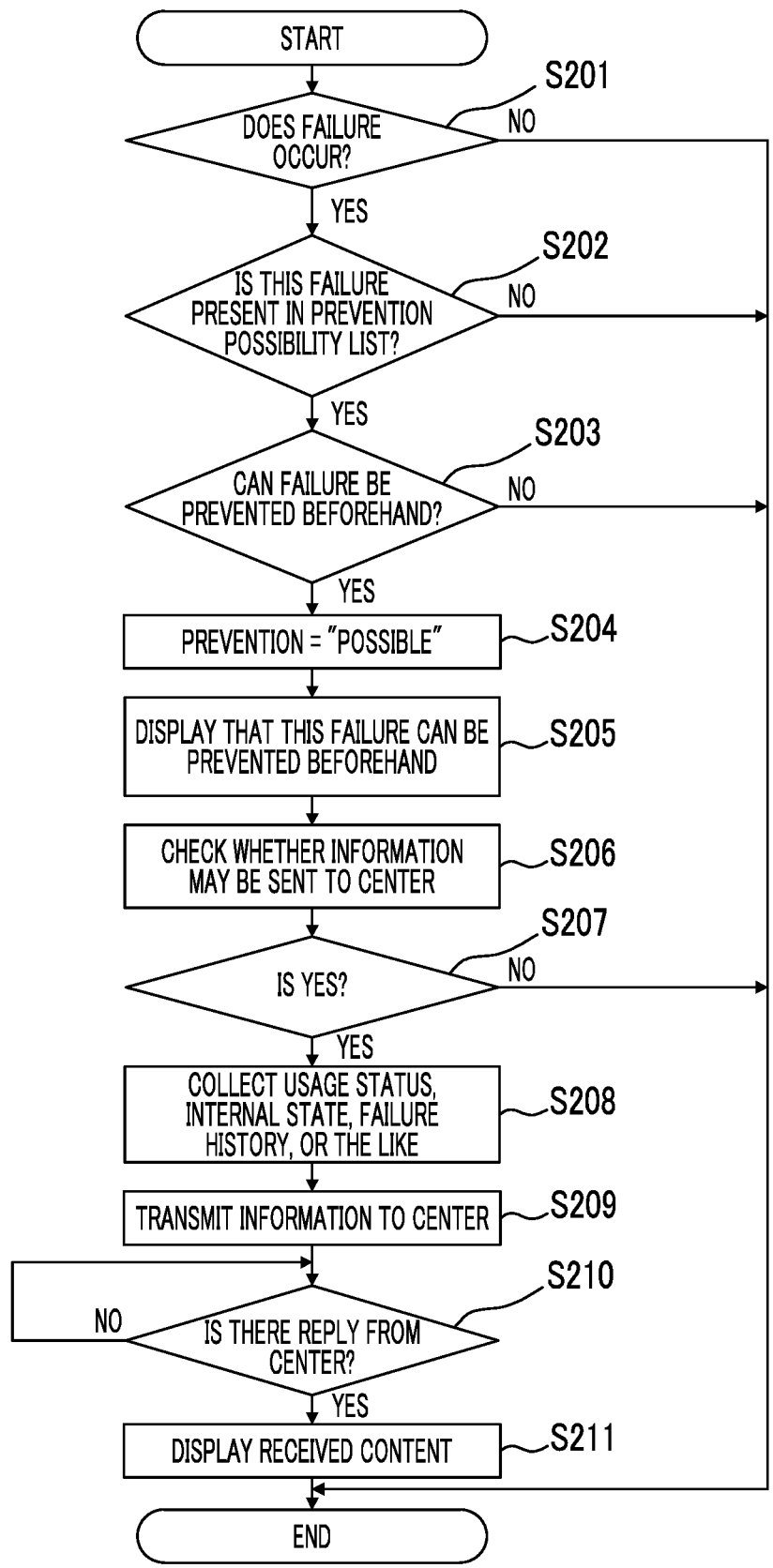
FIG. 7 is a flowchart showing a processing procedure of the image forming apparatus.

FIG. 7 is a flowchart showing a processing procedure of the image forming apparatus 1 according to the second exemplary embodiment. In addition, FIG. 7 corresponds to FIG. 3 showing the processing procedure in the case of the first exemplary embodiment, and in more detail, S201 to S203 of FIG. 7 correspond to S101 to S103 of FIG. 3, so that its explanation will be omitted. The management server 5 of the information providing system JS may be referred to as "center" below.

In the example of the processing procedure shown in FIG. 7, in a case where the occurrence of a failure is detected (Yes in S201) and this failure can be prevented beforehand by referring to the prevention possibility list (Yes in S202, and Yes in S203), the possibility diagnosis unit 14 (see FIG. 5) sets the prevention flag to "possible" (S204). Thus, an image indicating that failure can be prevented beforehand is displayed on the display unit 13 (S205). The failure handling image and the image indicating that failure can be prevented beforehand may be displayed on the display unit 13 (see S104, S105). Further, in the case where this failure cannot be prevented beforehand (No in S203), the failure handling image may be displayed while the image indicating that failure can be prevented beforehand may not be displayed (see S106).

In the case where the occurrence of a failure is not detected (No in S201), the process is ended as it is. In a case where a failure is detected and is not in the prevention possibility list (No in S202), the process is ended as it is.

Next, the multifunction peripheral controller 11 checks whether information may be sent to the center (management server 5) (S206). That is, contents to check whether to agree to transmit information including failure information to the information providing system JS are displayed on the display unit 13. On the other hand, in a case where the administrator or the user performs an agreement operation (Yes in S207), the multifunction peripheral controller 11 collects the usage status, the internal status, the failure history, or the like (S208) and transmits the collected information to the center (management server 5) (S209).

Then, the multifunction peripheral controller 11 checks whether or not there is a reply from the center (S210), and in a case where there is a reply, it displays the content on the display unit 13 (S211).

The term "usage status" referred to herein refers to information for specifying the operation status of plural functions possessed by the image forming apparatus 1 and refers to an operation history from the date the image forming apparatus 1 is installed. More specifically, for example, the number per month (usage) of paper on which images are formed by a printer or a copier can be exemplified.

The term "internal state" referred to herein refers to information for specifying the current state of the image forming apparatus 1 and refers to the state of consumables and maintenance parts mounted in the image forming apparatus 1. For example, replacement information or maintenance information for specifying toner replacement time, toner collection bottle replacement time, and the like is included.

Further, the failure history referred to herein refers to failure information about failures detected by its failure detection unit 12 (see FIG. 5), including failure information of this time and failure information generated in the past as well. Further, the failure history includes result information of failure diagnosis executed in the image forming apparatus 1.

Incidentally, the usage status, internal status, and failure information, referred to herein, may be referred to as "usage information".

Figure 8A:
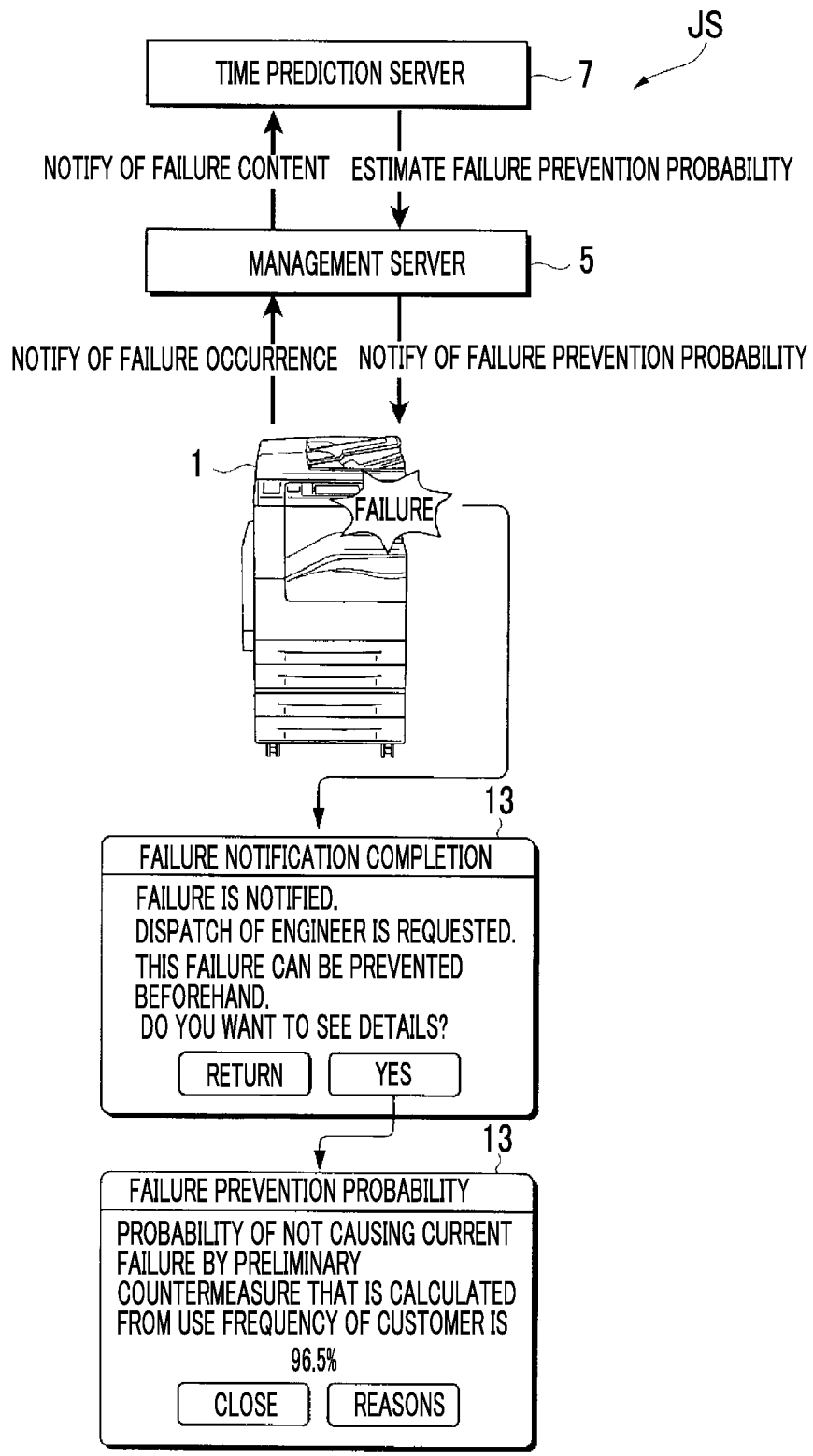
FIGS. 8A and 8B are diagrams for explaining an example of images displayed on a display unit when the detected failure can be prevented beforehand.
Figure 8B:
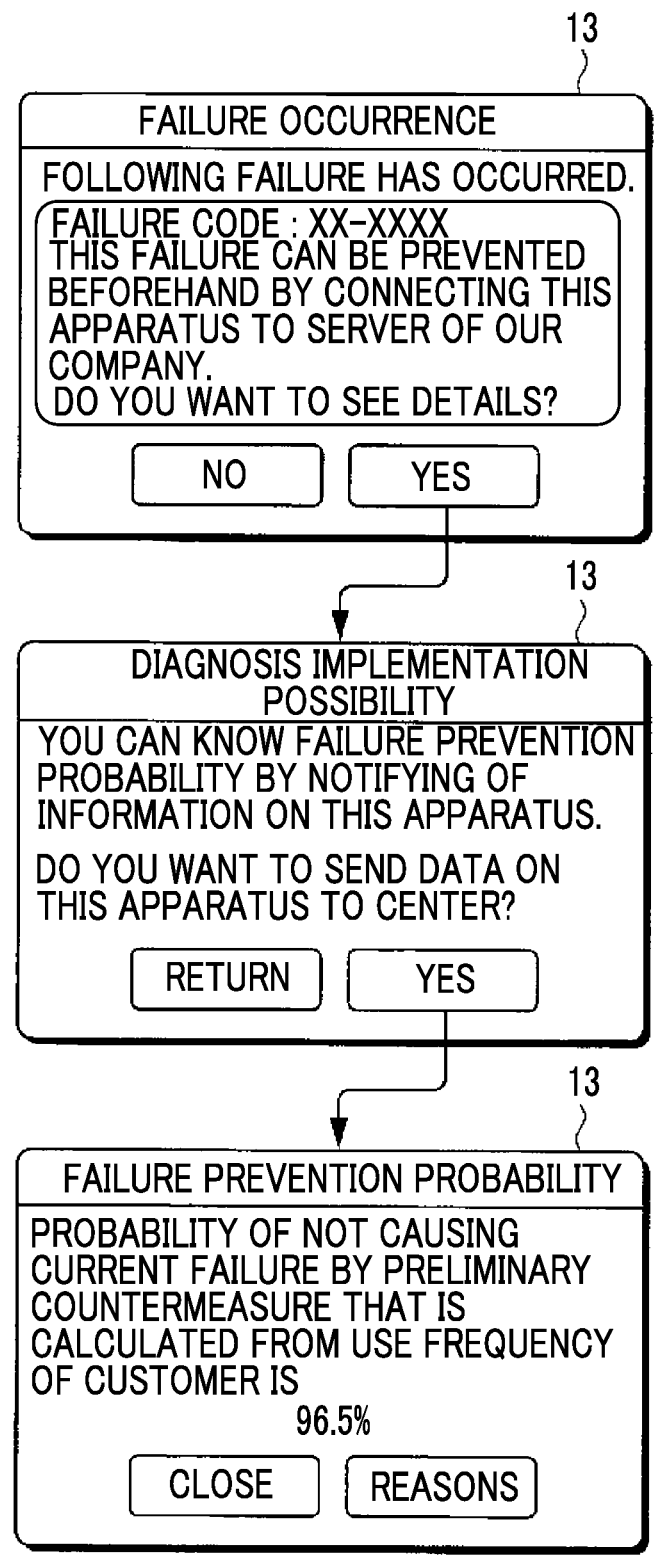

FIGS. 8A and 8B are diagrams for explaining an example of images displayed on the display unit 13 when the detected failure can be prevented beforehand, FIG. 8A shows one example thereof and FIG. 8B shows another example. FIGS. 8A and 8B correspond to FIGS. 4A and 4B showing the processing procedure in the case of the first exemplary embodiment.

As shown in the upper diagram of FIG. 8A, in a case where a failure occurs in the image forming apparatus 1, the image forming apparatus 1 notifies the management server 5 of the occurrence of the failure. It is conceivable to adopt a control example in which the occurrence of failure is notified on the premise that there is agreement of the administrator or user and the occurrence of failure is not notified when there is no agreement.

In a case of receiving the notification of the occurrence of a failure from the image forming apparatus 1, the management server 5 notifies the time prediction server 7 of the content of the failure, and in the time prediction server 7, the failure prevention probability is estimated by the prediction system controller 75 and the estimation result is notified to the management server 5. The management server 5 notifies the image forming apparatus 1 of the failure prevention probability from the time prediction server 7.

The content of the failure notified from the management server 5 to the time prediction server 7 includes information necessary for estimating the failure prevention probability by the prediction system controller 75 of the time prediction server 7. For example, it is information such as usage, failure history, failure diagnosis, and part replacement in the image forming apparatus 1.

In addition, in a case where there is a notification of the occurrence of a failure from the image forming apparatus 1, the management server 5 takes a measurement according to the occurred failure. Such a measurement is predetermined according to the content of the failure. In the example of FIG. 8A, a failure handling "dispatching engineers" is performed.

Such failure handling is displayed on the display unit 13 of the image forming apparatus 1. Specifically, as shown in FIG. 8A, a title of "failure notification completion" and an image including characters "A failure has been notified. Dispatch of an engineer is requested" is displayed on the display unit 13. On the display unit 13, characters "It is possible to prevent this failure beforehand, do you want to see the details?" and an image including the option ("return" and "yes") are displayed.

Then, in a case where "Yes" is selected among the options, the title "failure prevention probability" is displayed as the next display, and the failure prevention probability by preliminary countermeasure from the use frequency of the image forming apparatus 1 is displayed. Specifically, an image including characters "When calculating from the use frequency of the customer, the probability of not causing the current failure by preliminary countermeasure is 96.5%" and options ("close" and "reasons") is displayed. As described above, such a probability is determined by the prediction system controller 75 of the time prediction server 7.

In a case where "reason" is selected among the options, in addition to displaying the contents indicating the probability calculation basis on the display unit 13, it is conceivable to dispatch an explanatory person and give an explanation.

In another example shown in FIG. 8B, a title "failure occurrence", a failure handling image, and an image indicating that failure can be prevented beforehand are displayed together with the options ("No" and "Yes") (see FIG. 4B).

Then, in a case where "Yes" is selected at the time of displaying the title "failure occurrence", a title "diagnosis implementation possibility" is displayed this time. In order to display the failure prevention probability of this failure, it is notified that data needs to be sent to the center (the management server 5 of the information providing system JS). Specifically, the image including characters "You can know the failure prevention probability by notifying of the information on this apparatus. Do you want to send the data on the apparatus to the center?" and options ("return" and "yes") is displayed.

In a case where "Yes" is selected at the time of displaying the title "diagnosis implementation possibility" described above, a title "failure prevention probability" is displayed next, and the failure prevention probability by preliminary countermeasure from the use frequency of the image forming apparatus 1 is displayed. Such display contents are the same as those at the bottom of FIG. 8A described above.

FIGS. 9A to 9C are diagrams for explaining a process of the time prediction server 7 of the information providing system JS according to the second exemplary embodiment, FIG. 9A is a flowchart thereof, and FIGS. 9B and 9C show table used for processing of the time prediction server 7.

In the processing procedure example shown in FIG. 9A, the time prediction server 7 determines whether or not the failure prevention probability is requested (S301). In a case where it is determined that the failure prevention probability is requested, the time prediction server acquires an index value based on the usage period and the usage of paper of the requested apparatus (S302). Then, the time prediction server 7 acquires the failure prevention probability from the table, based on the model classification and the index value (S303), and notifies the management server 5 of the acquired failure prevention probability (S304). The failure prevention probability notified to the management server 5 is transmitted to the image forming apparatus 1 through the network NW.

In the processing procedure example shown in FIG. 9A, the table of FIG. 9B and the table of FIG. 9C are used. That is, in the above-described S302, the table shown in FIG. 9B in which the index value is allocated to the monthly usage of paper is used. For example, in a case where the monthly usage is 4000 sheets, the index value is "03".

In the above-described S303, the table shown in FIG. 9C in which the failure prevention probability is associated with the index value for each model is used. For example, in a case where the index value is "03", the failure prevention probability is 99.6%. The table of FIG. 9C is generated for each model (model classification), and a table corresponding to the model of the image forming apparatus 1 is used. The table in FIG. 9C is updated. The failure prevention probability shown in the same table is a virtual value designed to decrease as the index value increases. An example in which the failure prevention probability is not considered to be 100% is also conceivable, and this is because a failure may occur earlier than the status envisaged in the table in the case where the most recent use frequency becomes higher than before.

In the processing procedure example described above, the case where the failure prevention probability is derived from the monthly usage of paper has been described. That is, focusing on the recent use frequency, the failure prevention probability is derived according to the degree. However, without being limited thereto, the failure prevention probability may be derived using the detection results of the various sensors provided in the image forming apparatus 1. For example, the wear amount of rubber is measured by sensor detection, and the failure prevention probability is derived according to the wear amount.

Figures 10A, 10B:
FIGS. 10A and 10B are diagrams for explaining another method for determining the failure prevention probability.

FIGS. 10A and 10B are diagrams for explaining another method for determining the failure prevention probability, FIG. 10A is a diagram for explaining elements used for calculation of the failure prevention probability, and FIG. 10B is a failure code table caused by consumables and maintenance parts. The failure code table is generated for each model.

In the case shown in FIG. 10A, the failure prevention probability is calculated using the model code, the monthly usage, the delivery history of the maintenance parts, and the prevention success or failure of the occurrence of the related failure due to delivery (hereinafter abbreviated as "prevention success or failure"). That is, the failure prevention probability is calculated by accumulating facts whether or not there is occurrence of related failure caused by delivery of consumables and maintenance parts occurring every day. This calculation is performed using a predetermined mathematical expression.

The monthly usage in FIG. 10A is for obtaining the index value from the table of FIG. 9A described above. The prevention success or failure shown in FIG. 10A is determined based on whether a failure that may be caused by the delivered maintenance part has occurred or not, from the failure code table shown in FIG. 10B.

In addition, FIG. 10B includes an item of consumables and maintenance parts and an item of a related failure code, but in the latter case, the number and types of failures that can occur for each consumable or maintenance part are different.

Third Exemplary Embodiment

FIG. 11 is a diagram for explaining the configuration of an image forming apparatus 1 according to a third exemplary embodiment and corresponds to FIG. 2A illustrating the case in the first exemplary embodiment and FIG. 5 illustrating the case in the second exemplary embodiment. Note that descriptions of configurations common to those of the first and second exemplary embodiments described above may be omitted.

As shown in FIG. 11, the image forming apparatus 1 according to the third exemplary embodiment includes the multifunction peripheral controller 11, the failure detection unit 12, the display unit 13, the possibility diagnosis unit 14, the list holding unit 15, and the communication unit 16. Further, the image forming apparatus 1 includes an information collecting unit 17 that collects information from another image forming apparatus such as the image forming apparatus 3 (see FIG. 1) through the network NW, and an information providing unit 18 that provides information to another image forming apparatus such as the image forming apparatus 3.

The information collecting unit 17 is an example of an acquisition unit, and the communication unit 16 is an example of a reception unit that receives the probability that a failure based on the failure information of the image forming apparatus 1 and the information acquired by the acquisition unit is to be suppressed. Further, the display unit 13 is an example of a display that displays the probability received by the reception unit.

The information collecting unit 17 of the image forming apparatus 1 collects information from the image forming apparatus 3 by requesting the image forming apparatus 3. The collected information is transmitted to the multifunction peripheral controller 11 and further transmitted from the communication unit 16 to the information providing system JS (see FIG. 1) and accumulated in the actual data accumulation unit 74 (see FIG. 6) of the time prediction server 7. That is, the information collected by the information collecting unit 17 is used for deriving the failure prevention probability in the prediction system controller 75 of the time prediction server 7.

In addition to a case where the collection of information by the information collecting unit 17 is performed in response to a request to the image forming apparatus 3, the collection of information may be performed in a case where transmission from the image forming apparatus 3 to the image forming apparatus 1 is performed by satisfying a predetermined condition (for example, arrival at a predetermined time).

As described above, in the third exemplary embodiment, since the information collecting unit 17 is provided and thus the performance value is acquired in the environment close to the environment in which the image forming apparatus 1 is used, which makes it possible to exhibit more reliable effect.

By receiving an inquiry from the image forming apparatus 3, the information providing unit 18 provides information from the multifunction peripheral controller 11. The information provided by the information providing unit 18 may be information collected by the information collecting unit 17, in addition to the failure prevention probability transmitted from the information providing system JS.

Figure 12:
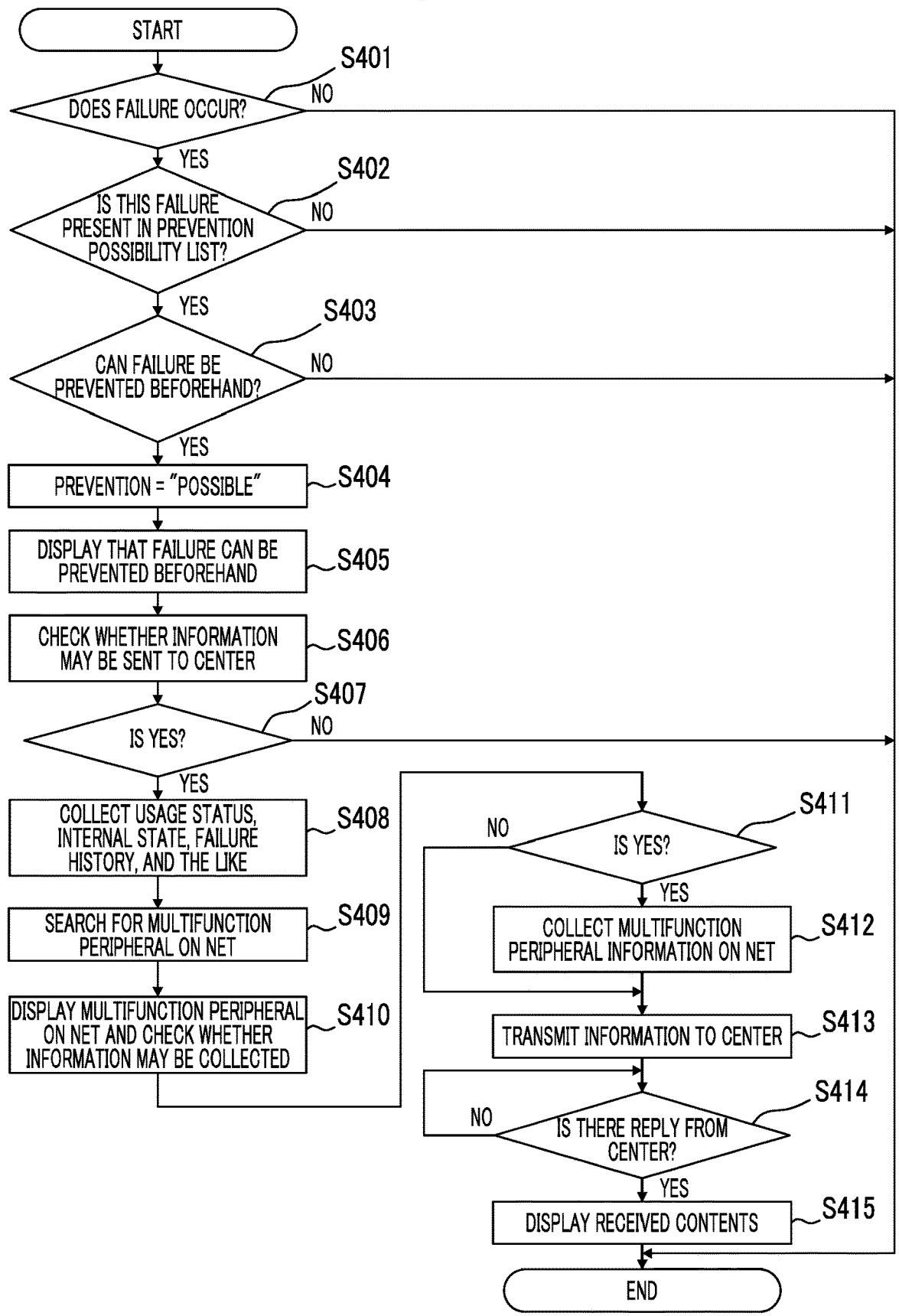
FIG. 12 is a flowchart showing a processing procedure of the image forming apparatus.

FIG. 12 is a flowchart showing a processing procedure of the image forming apparatus 1 according to the third exemplary embodiment and corresponds to FIG. 3 showing the case in the first exemplary embodiment and FIG. 7 showing the case in the second exemplary embodiment. More specifically, since S401 to S408, S414 and S415 in FIG. 12 correspond to S201 to S208, S210 and S211 in FIG. 7, the description thereof may be omitted.

In the processing procedure example shown in FIG. 12, in a case where there is an agreement to transmit information to the information providing system JS (Yes in S407), the multifunction peripheral controller 11 of the image forming apparatus 1 collects the usage status, internal state, failure history, and the like of the image forming apparatus 1 (S408). Further, another image forming apparatus connected through the network NW such as the image forming apparatus 3 is searched (S409). Another image forming apparatus referred to herein may be referred to as "multifunction peripheral on a net" in some cases.

In a case where the multifunction peripheral on the net is detected as a result of the search, for example, the multifunction peripheral on the net such as the image forming apparatus 3 is displayed on the display unit 13 of the image forming apparatus 1, and then it is checked whether information may be collected (S410, S411). On the display unit 13, the information acquired as the search result is displayed. That is, information that allows the administrator or user to identify which apparatus is displayed, for example, the name and type of the apparatus, network information (such as an IP address), and the like.

In a case where an administrator or the like perform an agreement operation (Yes in S411), the information collecting unit 17 (see FIG. 11) collects multifunction peripheral information on the net through the network NW (S412). The collected information is used for deriving the failure prevention probability of the image forming apparatus 1, in other words, information that contributes to enhancing the accuracy of the failure prevention probability. For example, it is information indicating the usage status of the apparatus and the internal state of the apparatus such as the degree of reduction of consumables.

The information collected in this manner is transmitted to the center by the communication unit 16 (see FIG. 11) (S413).

In a case where there is a reply from the center after transmitting information to the center (Yes in S414), the received contents are displayed on the display unit 13 of the image forming apparatus 1 (S415). Such display is exemplified in FIG. 13 to be described later.

Figure 13:
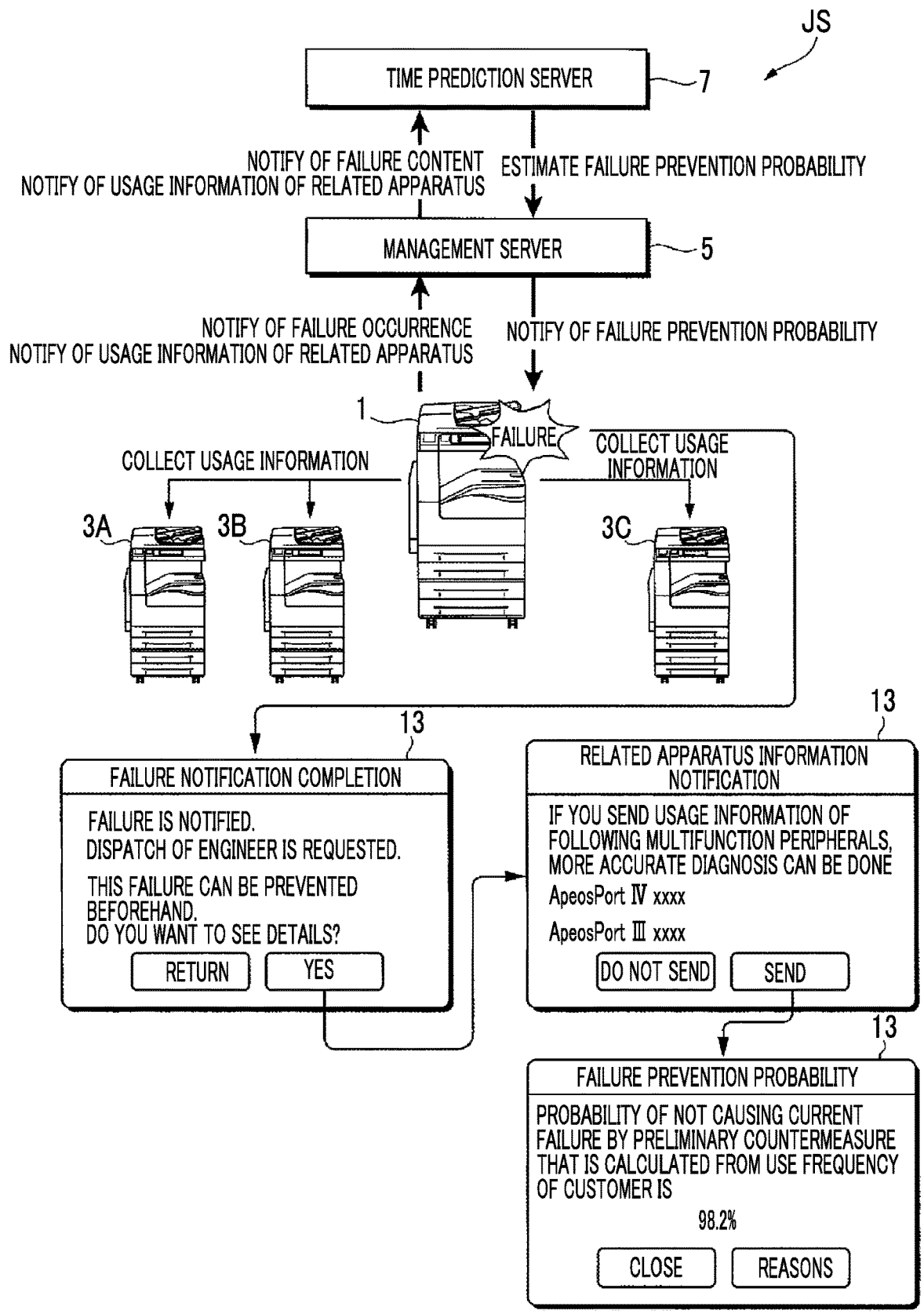
FIG. 13 is a diagram for explaining an example of images displayed on a display unit when the detected failure can be prevented beforehand.

FIG. 13 is a diagram for explaining an example of an image displayed on the display unit 13 when the detected failure can be prevented beforehand and corresponds to FIG. 4A illustrating the case in the first exemplary embodiment and FIG. 8A illustrating the case in the second exemplary embodiment.

As shown in the center of FIG. 13, in a case where a failure occurs in the image forming apparatus 1, the information collecting unit 17 of the image forming apparatus 1 collects usage information on the multifunction peripherals 3A, 3B, 3C on the net. "Usage information" referred to herein refers to usage status, internal status, and failure information.

As shown in the lower side of FIG. 13, in the image forming apparatus 1, in order to notify the administrator or the user of the failure handling by the management server 5, a screen of "failure notification completion" is displayed on the display unit 13, and this screen is switched to a screen of "related apparatus information notification" in a case where the option "YES" is selected.

On the screen "related apparatus information notification", an image including characters "If you send the usage information of the following multifunction peripherals, more accurate diagnosis can be done" and the names of the specific multifunction peripherals is displayed, and images including those options ("Do not send" and "Send") are also displayed.

Here, in a case where the option "send" is selected, as shown in the upper side of FIG. 13, the communication unit 16 of the image forming apparatus 1 notifies the management server 5 of the usage information of the related apparatus, and the management server 5 notifies the time prediction server 7 of the usage information. That is, the time prediction server 7 estimates the failure prevention probability in the image forming apparatus 1 using the usage information of the image forming apparatus 1, as well as the usage information of the multifunction peripherals 3A, 3B, 3C.

The failure prevention probability estimated by the time prediction server 7 is notified to the image forming apparatus through the management server 5 and notified to the administrator or the user on the "failure prevention probability" screen of the display unit 13.

Here, the failure prevention probability in the case of using the usage information of the multifunction peripherals 3A, 3B, 3C is 98.2%, which is different from 96.5% which is the failure prevention probability in the case of not using the usage information of the multifunction peripherals 3A, 3B, 3C. That is, in this case, by using the usage information of the multifunction peripherals 3A, 3B, 3C, failure prevention probability is increased. More specifically, since the image forming apparatus 1 does not transmit usage information to the management server 5 every time through the network NW, there is a circumstance that only the most recent usage information can be transmitted. Under such circumstances, there are the following examples as failures in which the failure prevention probability becomes higher in the case of offices using four apparatuses including the image forming apparatus 1 and the multifunction peripherals 3A, 3B, 3C than in the case of offices using a single image forming apparatus 1.

Toner

Types of documents to be frequently printed vary depending on office. For example, among the toners of four colors of yellow (Y), magenta (M), cyan (C), and black (K), in a case where Y tends to be reduced because there are many colored documents in solid colors, B tends to be reduced since black and white are used. Which type of toner tends to be reduced easily and correctly can be read in a case where there are more than one unit rather than one unit, and as a result, the prediction accuracy of the timing at which toner runs out increases and the failure prevention probability increases.

Document Feeder

In an office where there are many opportunities to use the scan function, the frequency of using the document feeder increases. As a result, due to wear of the document feed belt or the like, the document is shifted when the document is fed, and thus bent scanned image is obtained. In a case where there are multiple scanners, the number of scans using the document feeder can be known as the whole office, which is useful for improving the prediction accuracy of a single scanner.

Staple

In offices where there are many documents to be submitted to customers, more staples tend to be used. In a case where there are multiple apparatuses that can use staples, the accuracy of failure prediction increases based on the predicted usage.

Such various examples include failures for which the above-described failure prevention probability is high.

Here, from among the usage information of the multifunction peripherals 3A, 3B, 3C, for example, the multifunction peripheral 3A of which the usage information is close to the usage information of the image forming apparatus 1 is specified, and the performance of zeroing the downtime of the multifunction peripheral 3A is calculated. In other words, in the usage status close to the usage status in the environment of the image forming apparatus 1, the performance of zeroing the downtime of the apparatus is calculated. In this way, the failure prevention probability of the image forming apparatus 1 increases.

In this case, the multifunction peripherals 3A, 3B, 3C may be a non-managed object that does not receive the management service or a managed object that receives the management service. In addition, the multifunction peripherals 3A, 3B, 3C may be owned by the same company as that of the image forming apparatus 1, or may be owned by different companies.

Further, a case where the image forming apparatus 1 is installed in the same company as that of the multifunction peripherals 3A, 3B, 3C will be described. As a precondition, four apparatuses including the image forming apparatus 1 and the multifunction peripherals 3A, 3B, 3C are installed in the same office. The multifunction peripherals 3A, 3B, 3C are to be managed, and take a countermeasure to suppress the recurrence of failures. On the other hand, the image forming apparatus 1 is not to be managed and does not take a countermeasure to suppress the recurrence of failures.

In such a case, by using information of at least one of the three multifunction peripherals 3A, 3B, or 3C, the failure prevention probability of the image forming apparatus 1 is estimated. Such an estimation is performed by an analysis method different from the case of not using the information on the multifunction peripherals 3A, 3B, 3C. The estimated failure prevention probability is displayed on the display unit 13 of the image forming apparatus 1.

More specifically, for example, in a case where the multifunction peripheral 3A is close to the usage status of the image forming apparatus 1, the performance obtained by taking a countermeasure to suppress the recurrence of failures in the multifunction peripheral 3A is displayed in a case where the above-described image indicating that failure can be prevented beforehand is displayed on the display unit 13 of the image forming apparatus 1. In a case where the administrator of the image forming apparatus 1 is different from the administrators of the multifunction peripherals 3A, 3B, 3C, it is expected that the administrator of the image forming apparatus 1 is conscious of the usefulness of the management service by recognizing the failure prevention probability based on the multifunction peripheral 3A to be managed.

The information displayed on the display unit 13 of the image forming apparatus 1 as described above is an example of information related to another image forming apparatus that has taken measures to suppress the recurrence of a failure.

Figure 14:
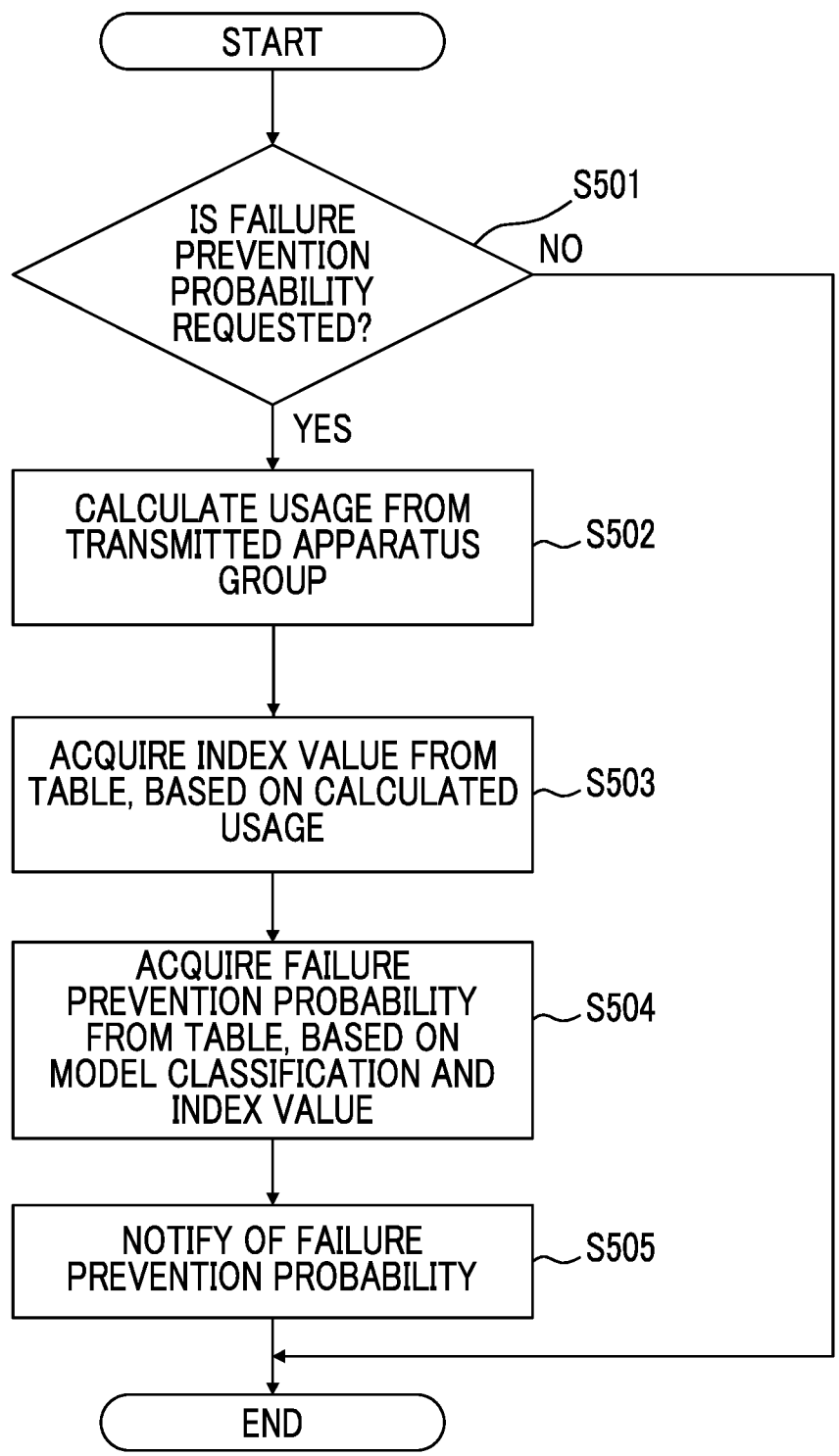
FIG. 14 is a flowchart showing a processing procedure of the information providing system.

FIG. 14 is a flowchart showing the processing procedure of the information providing system JS according to the third exemplary embodiment and corresponds to FIG. 9A showing the case in the second exemplary embodiment.

In the example of the processing procedure shown in FIG. 14, in a case where it is determined that the failure prevention probability is requested (Yes in S501), the time prediction server 7 calculates the usage from the transmitted apparatus group (S502).

The apparatus group referred to herein is apparatuses connectable to the image forming apparatus 1 through the network NW and are apparatuses having information that can contribute to the derivation of the failure prevention probability of the image forming apparatus 1. That is, although the time prediction server 7 can acquire the latest usage information on the image forming apparatus 1, it is difficult to acquire the past usage information from the image forming apparatus 1. Therefore, in order to increase the accuracy of the failure prevention probability of the image forming apparatus 1 by acquiring the most recent usage information from the apparatus group on the same network NW, the usage information from the apparatus group is acquired, and as described above, the usage of the apparatus group is calculated.

Then, the time prediction server 7 compares the usage of the image forming apparatus 1 with the usage of the apparatus group calculated in the above-described S502 and performs correction by multiplying the usage of the image forming apparatus 1 by the correction coefficient, based on the result. That is, it is determined whether the usage of the image forming apparatus 1 is larger or smaller than the usage of the apparatus group, the correction coefficient is determined according to the determination result, and the correction usage for the image forming apparatus 1 is calculated.

As the usage of the apparatus group, an average value of usages of plural apparatuses may be used.

The time prediction server 7 acquires the index value from the table (see FIG. 9B), based on the usage (corrected usage) of the image forming apparatus 1 calculated in this way (S503), acquires the failure prevention probability from the table, based on the model classification and the index value (S504), and notifies the management server 5 of the acquired failure prevention probability (S505).

As described above, in the present exemplary embodiment, by notifying the image forming apparatus 1 that does not subscribe to the management service of the effect to be achieved in the case of subscription, by numerical value, the administrator or the like can easily recognize the effect of the service, and thus it is possible to promote subscription to the service.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a processor configured to:
      detect a failure occurring in the information processing apparatus; and
      in response to detecting the failure occurring in the information processing apparatus, specify whether the failure occurring in the information processing apparatus can be suppressed before the failure occurs in the information processing apparatus, based on predetermined information; and
   a display that displays failure handling information related to enabling suppression of recurrence of the failure in response to specifying that the failure can be suppressed before the failure occurs in the information processing apparatus,
   wherein the failure that can be suppressed before the failure occurs in the information processing apparatus includes a failure caused by a consumable of the information processing apparatus.

2. The information processing apparatus according to claim 1, wherein the processor is further configured to:
   receive a probability that a failure based on failure information of the information processing apparatus is to be suppressed,
   wherein the display displays the received probability.

3. The information processing apparatus according to claim 2, wherein the processor is further configured to:
   transmit information including the failure information of the information processing apparatus to the information processing apparatus.

4. The information processing apparatus according to claim 1, wherein the processor is further configured to:
   acquire information including information on a failure occurring in a different image forming apparatus by communication with the different image forming apparatus.

5. The information processing apparatus according to claim 4, wherein the processor is further configured to:
   receive a probability that a failure based on failure information of information processing apparatus and the acquired information is to be suppressed,
   wherein the display displays the received probability.

6. An image forming apparatus comprising:
   a processor, configured to:
      detect a failure occurring in the image forming apparatus; and
      in response to detecting the failure occurring in the image forming apparatus, specify whether the failure occurring in the image forming apparatus can be suppressed before the failure occurs in the information processing apparatus, based on predetermined information; and
   a display that displays failure handling information related to enabling suppression of recurrence of the failure in response to specifying that the failure can be suppressed before the failure occurs in the information processing apparatus, wherein the failure that can be suppressed before the failure occurs in the information processing apparatus includes a failure caused by a consumable of the information processing apparatus, and displays information relating to a different image forming apparatus which handles the suppression of recurrence of the failure.

7. A non-transitory computer readable medium, storing instructions that are executable by a processor to:
   detect a failure occurring in an information processing apparatus;
   in response to detecting the failure occurring in the information processing apparatus, specify whether the failure occurring in the information processing apparatus can be suppressed before the failure occurs in the information processing apparatus, based on predetermined information; and
   displays failure handling information related to enabling suppression of recurrence of the failure in response to specifying that the failure can be suppressed before the failure occurs in the information processing apparatus, wherein the failure that can be suppressed before the failure occurs in the information processing apparatus includes a failure caused by a consumable of the information processing apparatus.

8. The information processing apparatus according to claim 1, wherein the failure handling information is information for offering a subscription of a service for the suppression of the recurrence of the failure before the failure occurs in the information processing apparatus.

9. The image forming apparatus according to claim 6, wherein the failure handling information is information for offering a subscription of a service for the suppression of the recurrence of the failure before the failure occurs in the information processing apparatus.

10. The non-transitory computer readable medium according to claim 7, wherein the failure handling information is information for offering a subscription of a service for the suppression of the recurrence of the failure before the failure occurs in the information processing apparatus.

* * * * *